US009316501B2

(12) United States Patent
Haverinen

(10) Patent No.: US 9,316,501 B2
(45) Date of Patent: Apr. 19, 2016

(54) GENERATING MAGNETIC FIELD MAP FOR INDOOR POSITIONING

(71) Applicant: INDOORATLAS OY, Oulu (FI)

(72) Inventor: Janne Haverinen, Kiviniemi (FI)

(73) Assignee: INDOORATLAS OY, Oulu (FI)

( * ) Notice: Subject to any disclaimer, the term of this patent is extended or adjusted under 35 U.S.C. 154(b) by 58 days.

(21) Appl. No.: 14/299,582

(22) Filed: Jun. 9, 2014

(65) Prior Publication Data

US 2014/0286534 A1    Sep. 25, 2014

Related U.S. Application Data

(63) Continuation of application No. 13/733,439, filed on Jan. 3, 2013, now Pat. No. 9,080,874.

(30) Foreign Application Priority Data

Jan. 11, 2012    (FI) ...................................... 20125030

(51) Int. Cl.
| G01C 21/00 | (2006.01) |
| G01C 17/02 | (2006.01) |
| G06K 9/00 | (2006.01) |
| G01C 21/20 | (2006.01) |
| G06T 7/00 | (2006.01) |
| G06F 17/16 | (2006.01) |

(52) U.S. Cl.
CPC .............. *G01C 21/005* (2013.01); *G01C 17/02* (2013.01); *G01C 21/206* (2013.01); *G06F 17/16* (2013.01); *G06K 9/00624* (2013.01); *G06T 7/0042* (2013.01); *G06T 2207/10004* (2013.01)

(58) Field of Classification Search
CPC ........ G01C 17/02; G01C 17/28; G01C 21/08; G01C 21/206; G01R 33/02; G01R 33/10; G01V 3/087; G01V 3/40; G06K 9/00624; G06K 9/00791; G05D 1/0231; G05D 1/0246; G05D 1/0259; G05D 1/0261; G06T 7/004; G06T 7/0042; G06T 7/0044
See application file for complete search history.

(56) References Cited

U.S. PATENT DOCUMENTS

| 2005/0194973 A1 | 9/2005 | Kwon et al. | .................. 324/260 |
| 2011/0294517 A1* | 12/2011 | Hahm et al. | .......... G01C 17/28 455/456.1 |

FOREIGN PATENT DOCUMENTS

WO    WO 2009/021068 A1    2/2009

OTHER PUBLICATIONS

Martinez et al; "Sensor and Connectivity Board (SCB) for Mobile Robots;" Proceedings of International Biennial Baltic Electronics Conference; Oct. 2008; pp. 175-178.

(Continued)

*Primary Examiner* — Andrew W Johns
(74) *Attorney, Agent, or Firm* — Oliff PLC

(57) ABSTRACT

Disclosed is an apparatus caused to acquire information indicating a measured magnetic field vector and information relating to an uncertainty measure of the measured magnetic field vector in at least one known location inside the building, wherein the indicated magnetic field vector represents magnitude and direction of the earth's magnetic field affected by the local structures of the building, and to generate the indoor magnetic field map for at least part of the building on the basis of at least the acquired information and the floor plan.

19 Claims, 5 Drawing Sheets

(56) References Cited

OTHER PUBLICATIONS

Gozick et al; "Magnetic Maps for Indoor Navigation;" IEEE Transactions on Instrumentation and Measurement; Dec. 2011; vol. 60; No. 12; pp. 3883-3891.

Vallivaara et al; "Simultaneous Localization and Mapping Using Ambient Magnetic Field;" Proceedings of IEEE International Conference on Multisensor Fusion and Integration for Intelligent Systems; Sep. 2010; pp. 14-19.

Haverinen et al; "Global Indoor Self-Localization Based on the Ambient Magnetic Field;" Robotics and Autonomous Systems; Oct. 2009; vol. 57; No. 10; pp. 1028-1035.

Nov. 14, 2012 Search Report issued in Finnish Patent Application No. 20125030.

Jan. 22, 2015 Office Action issued in U.S. Appl. No. 13/733,439.

* cited by examiner

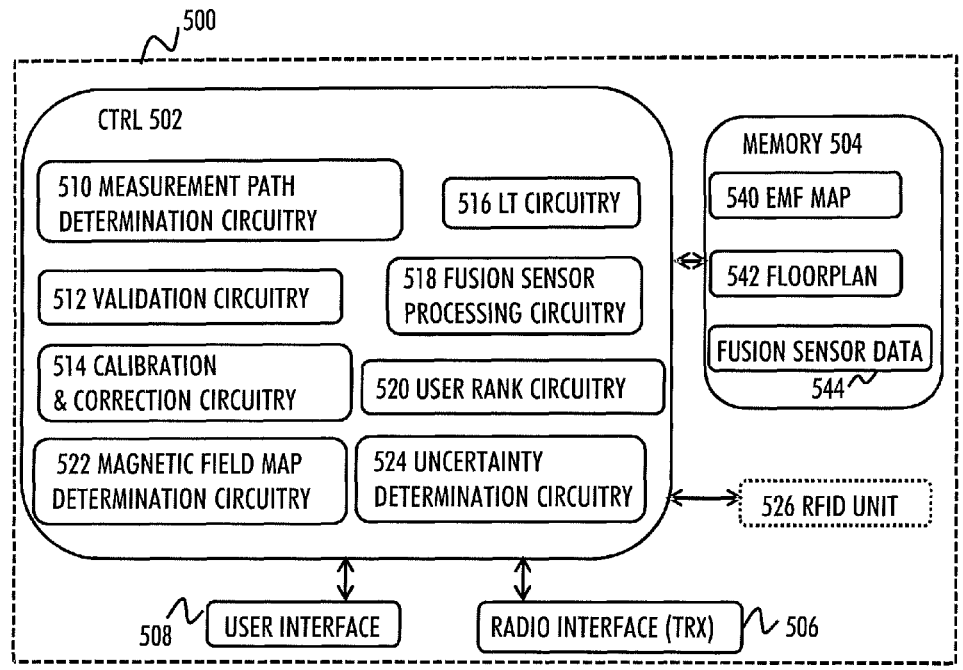
FIG. 5
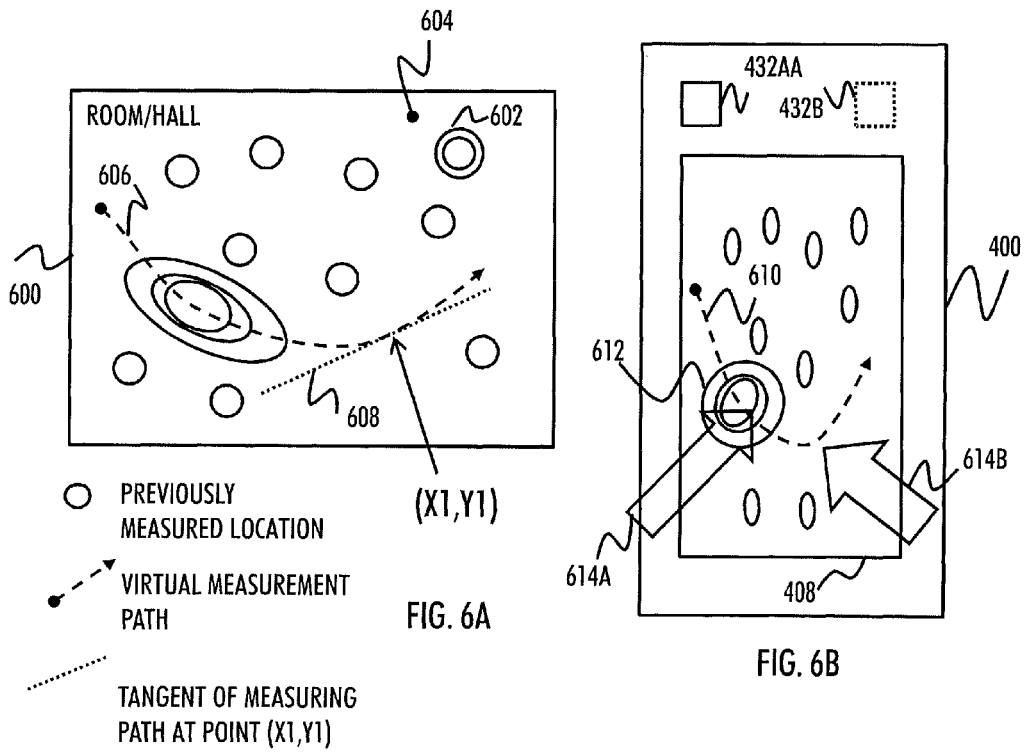
FIG. 6A
FIG. 6B

GENERATING MAGNETIC FIELD MAP FOR INDOOR POSITIONING

This is a Continuation of Application No. 13/733,439 filed Jan. 3, 2013, which claims the benefit of Finnish Patent Application No. 20125030 filed Jan. 11, 2012. The disclosure of the prior application is hereby incorporated by reference herein in its entirety.

FIELD

The invention relates generally to indoor positioning systems. More particularly, the invention relates to generating an indoor magnetic field map for indoor location discovery.

BACKGROUND

It may be of importance to locate or track a user when the user is inside a building. However, a well-known outdoor positioning system employing a global positioning system (GPS) may not work inside a building due to lack of reliable reception of satellite coverage. Therefore, a positioning technique utilizing Earth's magnetic fields indoors has been developed as one possible option for indoor location discovery. This type of location discovery applies, for example, a magnetic field strength measured by a positioning device. The measured strength is compared to known magnetic field strengths in the building in order to locate the positioning device and, thus, the person associated with the positioning device. However, several problems are related to this type of location tracking, especially to generating an indoor magnetic field map usable for the indoor positioning based on Earth's magnetic fields.

BRIEF DESCRIPTION OF THE INVENTION

According to an aspect of the invention, there is provided an apparatus as specified in claim 1.

According to an aspect of the invention, there is provided a method as specified in claim 16.

According to an aspect of the invention, there is provided a system as specified in claim 17.

According to an aspect of the invention, there is provided an apparatus comprising means configured to cause the apparatus to perform any of the embodiments as described in the appended claims.

LIST OF DRAWINGS

In the following, the invention will be described in greater detail with reference to the embodiments and the accompanying drawings, in which FIG. 1 presents a floor plan of a building;

FIG. 5 illustrates an apparatus, such as a database entity, according to an embodiment;

FIGS. 6A and 6B depict an example measurement scenario and how a measurement path may be generated, according to embodiments;

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In order to enable positioning indoors, a radio frequency (RF) and/or GPS based location discovery and/or tracking is known. The GPS location discovery may not, however, be suitable for indoors due to lack of satellite reception coverage. Also the RF based location discovery and location tracking may only be possible by determining the indoor base station to which the user device is connected to, a round trip time of the RF signal, or the power of the received RF signal, for example. This type of location tracking may suffer from a lack of accuracy, for example, when the user gets located by two different RF base stations. Also, the coverage area of one base station may be wide resulting in poor accuracy. Some other known positioning measures, which may be applicable indoors, include machine vision, motion sensor and distance measuring, for example. However, each of these requires expensive measuring devices and equipment mounted throughout the building. As a further option, the utilization of Earth's magnetic field (EMF) may be applied.

The material used for constructing the building may affect the EMF measurable in the building and also the EMF surrounding the building. For example, steel, reinforced concrete, and electrical systems may affect the EMF. The EMF may vary significantly between different locations in the building and may therefore enable accurate location discovery and tracking inside the building based on the EMF local deviations inside the building. On the other hand, the equipment placed in a certain location in the building may not affect the EMF significantly compared to the effect caused by the building material, etc. Therefore, even if the layout and amount of equipment and/or furniture, etc., change, the measured EMF may not change significantly.

Figure 1:
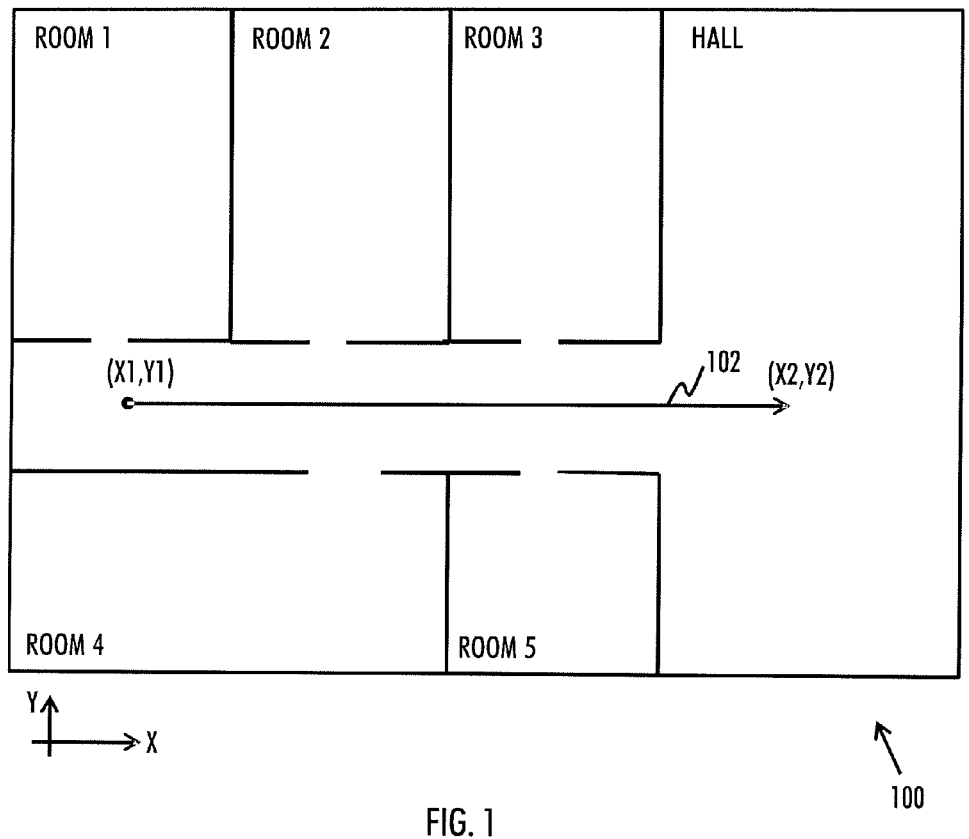

An example of a building 100 with 5 rooms, a corridor and a hall is depicted in FIG. 1. It is to be noted that the embodiments of the invention are also applicable to other type of buildings, including multi-floor buildings. The floor plan of the building 100 may be represented in a certain frame of reference. A frame of reference may refer to a coordinate system or set of axes within which the position, orientation, etc. are measured, for example. Such a frame of reference of the building in the example of FIG. 1 may be an XY coordinate system, also known in this application as the world coordinate system. The coordinate system of the building 100 may also be three dimensional when vertical dimension needs to be taken into account. The vertical dimension is referred with Z, whereas X and Y together define a horizontal two-dimensional point (X,Y). In FIG. 1, the arrow starting at a point (X1, Y1) and ending at a point (X2, Y2) may be seen as a path 102 traversed by a user associated with an EMF measuring device. The Z dimension is omitted for simplicity. The measuring device is detailed later, but for now it may be said, that the measuring device may comprise a magnetometer or any other sensor capable of measuring the EMF. The magnetometer may comprise at least one orthogonal measuring axis. However, in an embodiment, the magnetometer may comprise three-dimensional measuring capabilities. Yet in one embodiment, the magnetometer may be a group magnetometer or a magnetometer array which provides magnetic field observation simultaneously from multiple locations spaced apart. The magnetometer may be highly accurate sensor and even small variations in the EMF may be noticed. In addition to the strength, also known as magnitude, intensity or density of the magnetic flux, of the magnetic field, the magnetometer may be capable of determining a three-dimensional orientation of a measured EMF vector. To this end, it should be noted that at any location, the Earth's magnetic field can be represented by a three-dimensional vector. Let us assume that a compass needle is tied at one end to a string such that the needle may rotate in any direction. The direction the needle points, is the direction of the Earth's magnetic field vector.

Figure 2A:
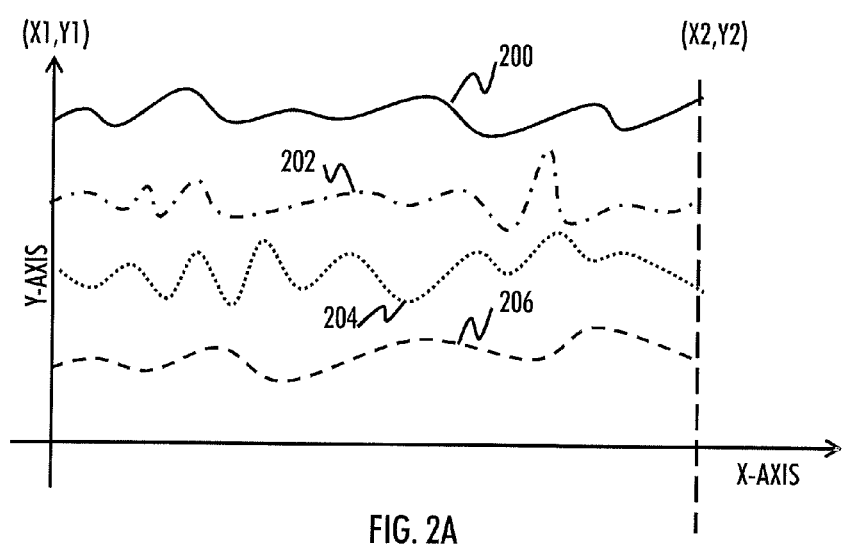
FIGS. 2A to 2C show a measuring device and example measured magnetic field vector.
Figure 2B:
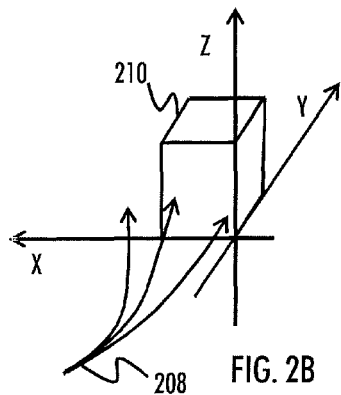
Figure 2C:
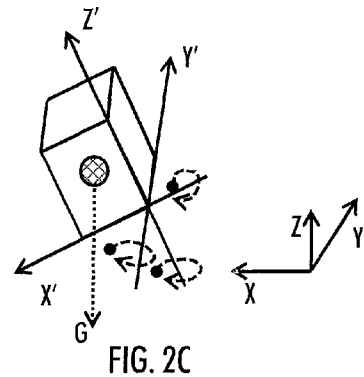

As said, the magnetometer carried by a person traversing the path 102 in FIG. 1 is capable of determining the three-dimensional magnetic field vector. The three components of the EMF vector as well as the total strength are shown in FIG. 2A throughout the path 102 from (X1, Y1) to (X2, Y2). The solid line 200 may represent the total strength of the magnetic field vector and the three other lines 202 to 206 may represent the three components of the three dimensional magnetic field vector. For example, the dot-dashed line 202 may represent the Z component (vertical component), the dotted line 204 may represent the X component, and the dashed line 206 may represent the Y component. From this information, the magnitude and direction of the measured magnetic field vector may be extracted. FIG. 2B shows how the Earth's magnetic field 208 is present at the location of an object 210. In FIG. 2B, the object 210 is oriented in the three-dimensional space XYZ according to the frame of reference of the building. However, typically the object is moving and the three-dimensional orientation of the object 210 may vary from the frame of reference of the building as shown in FIG. 2C. In this case, the three-dimensional frame of reference is not for the building but for the object 210. Such frame of reference may be denoted with X', Y', and Z' corresponding to rotated X, Y, and Z of the world coordination system. The G vector in FIG. 2C denotes the gravitational force experienced by the object 210.

In location tracking of the user or any target object moving in the building 100, the EMF vector measured by the positioning device carried by the user may be compared to existing information, wherein the information may comprise EMF vector strength and direction in several locations within the building 100. The information may depict an indoor EMF map. The positioning device of the user may comprise at least part of the EMF map, the positioning device may access the EMF map stored somewhere else in a network accessible by the positioning device, or the positioning device may forward the measured EMF vector data to a database entity or server which has access to the EMF map and thus capable to locate the user in the floor plan of the building. Preferably, the EMF map covers most or all of the building so that the user may be reliably located without "black spots".

However, before such location tracking applying the measured EMF vector may take place, the magnetic field map for the operational environment, such as for the building 100, may be needed. This may be cumbersome and it may take a lot of effort because there are a vast number of buildings to be measured. For this reason it is proposed a solution which allows any person, a mapper from now on, to contribute in the generation of the magnetic field map for indoors. Such crowd sourcing approach may provide an efficient manner in acquiring the EMF map for a large number of buildings. Any person may apply a measuring device, or a mapping device, in order to measure the EMF vectors indoors and thus contribute in generation of EMF map. The measuring device applied by each person may be his/her mobile phone or any mobile device. This may be possible as today's mobile devices may be equipped with a magnetometer and radio interface components, for example. The mapper may measure the EMF vector in a certain location/path and provide the measured data to a central database entity, for example.

Figure 3:
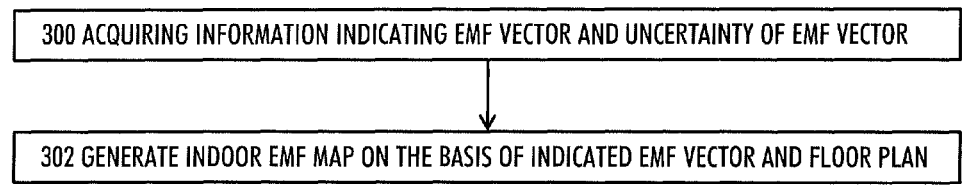
FIG. 3 shows a method for generating the indoor magnetic field map, according to an embodiment.

However, in such crowd sourcing, the reliability of the data provided by a mapper may be questionable. Thus, solution for generating an indoor magnetic field map for any building 100 is proposed. This may be performed as shown in FIG. 3 by acquiring, in step 300, information indicating the EMF vector and information relating to an uncertainty measure of the EMF vector in at least one known location inside the building 100, wherein the indicated EMF vector represents measured magnitude and direction of the earth's magnetic field affected by the local structures of the building 100. The known location inside the building may be defined in the frame of reference of a floor plan of the building 100. The apparatus performing the map generation may comprise the floor plan information or it may access the floor plan information via radio interface, for example. The information relating to the uncertainty measure, which is detailed later, may represent at least one of uncertainty of the magnitude of the EMF vector and uncertainty of the direction of the MFV. In step 302, the indoor EMF map for at least part of the building 100 is generated on the basis of at least the acquired information and the floor plan of the building 100, wherein the indoor EMF map comprises the EMF vector and the uncertainty measure of the EMF vector for at least one location inside the building 100. Therefore, the EMF map advantageously describes not only the strength and direction of the magnetic field but also the uncertainty measure of the EMF vector at the specific location. This information may be used for example by the target object whose location is to be discovered/tracked in knowing which parts of the building are not the most reliable in terms of magnetic field based tracking and which parts of the building are very reliable. In addition, a mapper contributing to the EMF map may apply this uncertainty information in determining which parts of the building still need more accurate EMF vector measurements. This uncertainty information may also be used in determining is the provided EMF vector data reliable or not, as will be detailed later.

To more clearly disclose the manner in which each user may contribute to the generation of the EMF map, let us image that mapper associated with a certain measuring device is in the building 100. The mapper may at a specific location determine the EMF vector, which location is determined in the frame of reference of the floor plan of the building. The measuring device may also determine parameters which affect the reliability measure, i.e. the uncertainty measure of the EMF vector. Then the mapper may move to another location and perform the same steps. As the measuring device may be equipped with an efficient processor or alike, the mapper may simply walk along a measurement path/area during which walk the measuring device performs the above mentioned steps. As the EMF vector and the uncertainty is known at several spots around the building 100, the EMF map may be generated either as being discrete or continuous. When making it continuous, the discrete map points may be interpolated to yield a substantially continuous magnetic field map. The interpolation may be applied for both the magnetic field vector values and the uncertainty measure values.

The above mentioned steps may be performed in an embodiment at the measuring device associated to the mapper. In other words, the measuring device may measure, i.e. acquire, the information relating to the MFVs and the uncertainties and then generate the indoor EMF map. As a further action, the measuring device may then cause communication of the generated map to a database entity that may be responsible of storing the maps of the buildings. In another embodiment, the measuring device determines the EMF vectors and the uncertainties and then causes transmission of the information indicating these to the database entity. The database entity receives, i.e. acquires, the information and then generates the EMF map based on the data acquired. The database entity may thus acquire the information indicating the magnetic field vector from the measuring device that has measured the magnetic field vector. This embodiment may allow for less complexity and less memory usage at the measuring device, which typically has limited computational and storing capabilities compared to the database entity. Thus, according to the embodiment, the magnetic field map, the floor plan, or any other map representing the operational environment, may be stored in the measuring device, in the database entity, in both, or the storage of data may be at least partly shared between the two apparatuses. To this end, it should be noted that the database entity may comprise one or more elements in the network accessible by the measuring device.

In addition to the EMF vector for at least one location of the building and the uncertainty measure for the EMF vector at the location, the EMF map may also comprise other information, such as association to the mapper (user) who has contributed in generating the EMF map data for the specific location. The association to the user may comprise profile information of the user, such as the height of the user, which may affect the applied altitude of the measuring device of the user, the age of the user, the reliability or rank (to be explained later) of the user, which may affect the reliability of the map, etc. Such data may be communicated to the database entity along with other information.

For the transmission and/or reception of information, the apparatuses may apply, for example, wireless cellular radio network employing any of the following radio access technologies (RATs): Worldwide Interoperability for Microwave Access (WiMAX), Global System for Mobile communications (GSM, 2G), GSM EDGE radio access Network (GE-RAN), General Packet Radio Service (GRPS), Universal Mobile Telecommunication System (UMTS, 3G) based on basic wideband-code division multiple access (W-CDMA), high-speed packet access (HSPA), LTE, and/or LTE-A. Alternatively, for example short range radio communication techniques including wireless local area network and Bluetooth, may be applied. Although, the map generation may be, as explained, performed in the measuring device, let us for simplicity reasons concentrate in the following to the case where the measuring devices measures the EMF vector and causes transmission of data to the database entity which generates the map.

Figure 4:
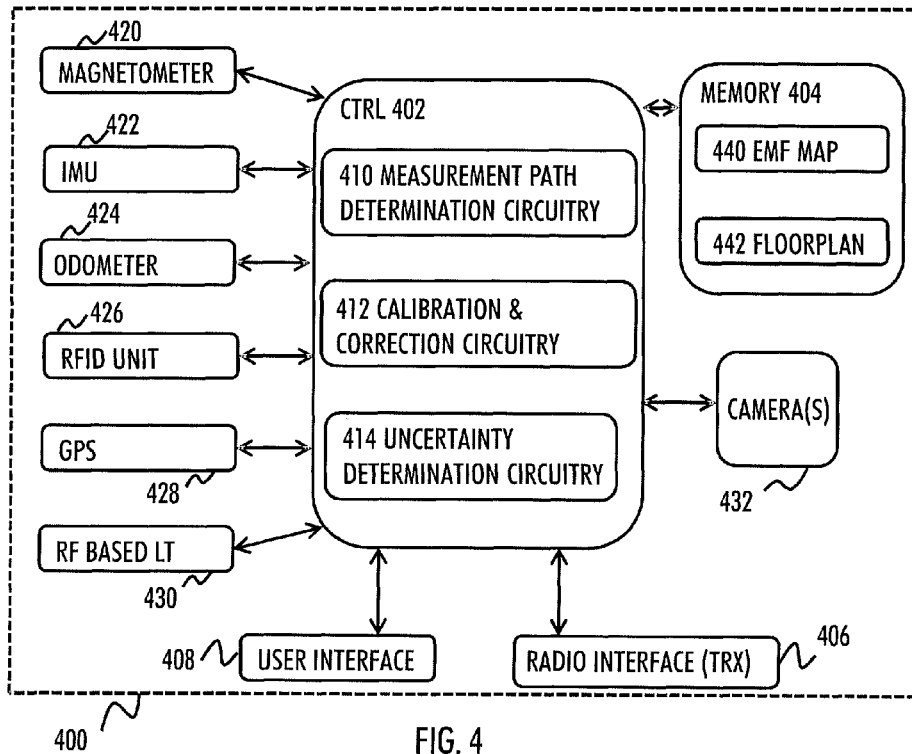
FIG. 4 illustrates an apparatus, such as a measuring device, according to an embodiment.

Let us next take a look at the apparatuses, such as the measuring device and the database entity, which may employ the embodiments of the invention. FIG. 4 shows an example of a measuring device 400 and FIG. 5 depicts an example of a database entity 500. It should be noted that FIGS. 4 and 5 show only the elements and functional entities required for understanding the apparatuses. Other components have been omitted for reasons of simplicity. The implementation of the elements and functional entities may vary from that shown in the figures. The connections shown in FIGS. 4 and 5 are logical connections, and the actual physical connections may be different. The connections can be direct or indirect and there can merely be a functional relationship between components. It is apparent to a person skilled in the art that the apparatus may also comprise other functions and structures. Similarly, it is apparent to a skilled person that some functionalities and corresponding functional entities may be either added or omitted from the apparatuses depending on the application of the apparatus. For example, when the measuring device 400 is to perform the EMF map generation, corresponding circuitries may be added to the apparatus 400. On the other hand, when no RFID based connection is needed, the RFID unit(s) may be omitted from the apparatuses, for example.

Embodiments, as shown in FIGS. 4 and 5, provide apparatuses 400 and 500 comprising at least one processor 402, 502 and at least one memory 404, 504 including a computer program code, which are configured to cause the apparatuses to carry out functionalities according to the embodiments. The at least one processor 402, 502 may each be implemented with a separate digital signal processor provided with suitable software embedded on a computer readable medium, or with a separate logic circuit, such as an application specific integrated circuit (ASIC). The apparatuses 400 and 500 may further comprise radio interface components 406 and 506 providing the apparatus 400, 500, respectively, with radio communication capabilities with the radio access network. User interfaces 408 and 508 may be used in operating the measuring device 400 and the database entity 500 by a user. The user interfaces 408, 508 may each comprise buttons, a keyboard, means for receiving voice commands, such as microphone, touch buttons, slide buttons, etc.

The apparatus 400 may comprise the terminal device of a cellular communication system, e.g. a computer (PC), a laptop, a tabloid computer, a cellular phone, a communicator, a smart phone, a palm computer, or any other communication apparatus. In another embodiment, the apparatus is comprised in such a terminal device, e.g. the apparatus may comprise a circuitry, e.g. a chip, a processor, a micro controller, or a combination of such circuitries in the terminal device and cause the terminal device to carry out the above-described functionalities. Further, the apparatus 400 may be or comprise a module (to be attached to the terminal device) providing connectivity, such as a plug-in unit, an "USB dongle", or any other kind of unit. The unit may be installed either inside the terminal device or attached to the terminal device with a connector or even wirelessly. The apparatus 500 as the database entity may be comprised in the network accessible by the apparatus 400 of FIG. 4. As said, the apparatus 400, such as the measuring device operated by a typical person in the crowd sourcing approach, may comprise the at least one processor 402. The at least one processor 402 may comprise a measurement path determination circuitry 410. The circuitry 410 may responsible of determining a measurement path or area, which is to be measured by the device 400. The details of the functionalities related this circuitry 410 will be described later. A magnetometer 420 may be used to measure the EMF vector. An uncertainty measurement circuitry 414 may be used to determine the uncertainly measure of the measured EMF vector. At least partly for this reason, there may be various other sensors or functional entities comprised in the measuring device 400. These may include an inertial measurement unit (IMU) 422, an odometer 424, a radio frequency identification (RFID) unit 426, a GPS sensor 428, a radio frequency (RF) based location tracking sensor 430, at last one camera 432, for example. These will be described later in details. The memory 404 may comprise information of the magnetic field map 440 and of the floor plan 442 of the building 100. The memory may also be used for storing measured values during the measurement path, for example. A calibration & correction circuitry 412 may be for performing calibration and/or correction related to the functions of the apparatus 400, such as for the measurement of the EMF vector by the magnetometer 420.

In an embodiment, the apparatus 400 or part of the apparatus 400 is coupled to a shoe of the mapper. For example, the magnetometer 420 may be integrated into the shoe of the mapper. The shoe may also comprise a radio interface through which the measurement results of the measurements performed by the magnetometer 420 are communicated to a terminal device. The terminal device may comprise the rest of the functionalities of the apparatus 400. This may provide for accurate EMF measurements as the shoe of the mapper typically has a predictable three dimensional orientation, which aids in obtaining accurate results as will be described below.

The apparatus 500, such as the database entity, may comprise the at least one processor 502. The at least one processor 502 may comprise several circuitries. As an example, a measurement path determination circuitry 510 may be responsible of determining or allocating a measurement path or area, which is to be measured or which has been measured by the measuring device 400. A validation circuitry 512 may be responsible of determining whether acquired data is valid or not. A calibration & correction circuitry 514 may be responsible of performing a calibration process for the indicated information and/or correcting the acquired information. A user rank circuitry 520 may be responsible of evaluating the users who have provided EMF vector related data to the database entity 500. As a result, each user may be associated with a rank which describes for example how reliable and extensive the data obtained from the user is. A magnetic field map determination circuitry 522 and an uncertainty determination circuitry 524 may be responsible of generating the EMF MAP based on the acquired information relating to MFVs and floor plan of the building 100, for example, and for determining the uncertainty of the EMF vector at a certain location in the map. The memory 504 may comprise information of the magnetic field map 540, of the floor plan 542, of the building 100, and of fusion sensor data 544, for example.

A location tracking (LT) circuitry 516 may be responsible of facilitating the location discovery of a positioning device that is to be located in the building. In an embodiment, the LT circuitry 516 may apply the generated EMF map and provide, on request, at least part of the generated indoor magnetic field map to the positioning device that is to determine its location inside the building to which the EMF map is applicable. The LT circuitry 516 may provide the entire EMF map of the building 100 to the positioning device via network. Alternatively, the LT circuitry 516 may provide only a part of the EMF map to the positioning device, wherein the part of the generated indoor EMF map to provide is selected on the basis of location estimate of the positioning device, wherein the location estimate is acquired from a non-magnetic field based location discovery system. For example, if the building is equipped with another location discovery system, such as for example indoor base station based location discovery, the information provided by that other location technique may be used. Such additional data may obtained by the RF based location tracking unit of a positioning device, transmitted to the database entity 500 and processed in a fusion sensor processing circuitry 518 of the database entity 500, for example. The memory 504 may comprise the information of the other location technique as fusion sensor data 544. The information stored may comprise the mounting location of the indoor base stations, for example. By knowing the location of the positioning device, at least roughly, the LT circuitry 516 may then provide EMF map only for the area where the positioning device is currently moving, such as for the floor of the building where the positioning device is. This may be advantageous so that only a part of the large EMF map needs to be communicated to the positioning device. The positioning device may then use the map, or part of the map, in locating itself in the building 100.

Let us next consider the information relating to the uncertainty measure acquired by/from the measuring device 400. In an embodiment, the uncertainty measure of the magnetic field vector may be location specific. This may denote that the uncertainty measure may vary from location to location within the building. This may be due to the fact that the measurement is performed better in a certain location than in another location, even if the measurement is made by the same mapper. For example, the measuring device 400 may have been more static during the measurement in the first location resulting in more accurate measurement. As another example, the mapper may have walked more slowly in the first location, which also may contribute positively in the accuracy of the EMF vector measurement. Furthermore, some parts of the building may have temporal (dynamic) magnetic interferences, e.g. caused by electric devices, which may contribute negatively in the accuracy of the EMF vector measurement.

In an embodiment, the uncertainty measure for a location (for a map point) may be determined at least partly on the basis of number of at least one existing magnetic field vector measurement in the location. Let us take a look at FIG. 6A. The figure shows a generated EMF map for one room 600. The EMF MAP may be generated on the basis of previously measured locations, marked with circles in FIG. 6A. As shown, the upper part of the room 600 has been measured with higher density than the rest of the room. In particular, the location 602 may have been measured at least twice, possibly by the same mapper or by different mappers. The at least two separate EMF vector data sets may have been combined resulting in one EMF vector for the location 602. However, acquiring two, possibly independent data sets for one location, reduces the change that the EMF vector for the location is inaccurate. Thus, the uncertainty for the EMF vector in the location 602 may be lower than for other locations, which may have been measured only once. However, it should be noted that this depends on the acquired uncertainty measure related to each of the two measurements performed at the location 602.

In an embodiment, the uncertainty measure for a location may be at least partly determined on the basis of physical distance to the at least one existing magnetic field vector measurement from the location. Let us again take a look at FIG. 6A. Imagine that the uncertainty measure is to be determined for the map point 604. As seen, there are no previously made measurements at the location 604. Therefore, the uncertainty may be at least partly determined on the basis of the physical distance to the at least one existing EMF vector measurement. In the example embodiment of FIG. 6A, the distance may be determined to the measurement location 602, and/or to any other at least one measured location shown with circle in FIG. 6A. The further the distance is, the higher may be the uncertainty measure.

In an embodiment, the uncertainty measure for a location may be at least partly determined on the basis of amount of deviation between at least two different magnetic field vector measurements for the location, possibly from at least two different measuring devices. This may be the case when there are at least two measurement performed in one location, such as in the location 602. If the deviation between the two measurements varies significantly, for example more than a predetermined threshold, the uncertainty measure may be high. The threshold may be determined, for example, by empirical experimentations. In other words, the higher the deviation, the higher may be the uncertainty measure. The deviation may refer to deviation in the measured magnitude, deviation in the measured direction, deviation in the indicated uncertainty of the measured magnetic field vector, etc.

In an embodiment, the uncertainty measure for a location may be at least partly determined on the basis of amount of variance in local motion data provided by one or more inertial sensors coupled to a measuring device 400 that measured the magnetic field vector in the location. Thus, the inertial measurement unit (IMU) 422, described in detail later, may provide information on the local motion the measuring device 400 is experiencing. For example, if the mapper rotates the measuring device 400, for example back and forth, during measurement procedure, the amount of local motion is high. This may not lead to most reliable measurement accuracy, even though some of the local motion is correctable, as will be described later. The measuring device 400 may itself use this local motion information in determining the uncertainty of the measurement performed or may forward the information to the database entity 500 which makes the determination.

In an embodiment, the uncertainty measure for a location may be at least partly determined on the basis of a specific model and/or type of the measuring device 400 and/or an electrical state of the measuring device 400. This is because it may have been determined that a specific type or model may or may not provide very accurate measurement results. The type and/or model may refer to the measuring device 400 (for example to the mobile phone), or it may refer to the magnetometer 420 applied, or to both. The electrical state of the measuring device 400 may also affect the reliability of the measurement procedure. For example, certain software functions, such as phone calls, simultaneously running in the measuring device 400 and dynamically changing the electrical/mechanical state of the measuring device 400 may affect the reliability of the measurement by introducing magnetic interferences. Therefore, the measuring device 400 may determine the uncertainty of the measurement performed by taking the above into account, for example, or may transmit the information to the database entity 500.

In an embodiment, the uncertainty measure for a location may be at least partly determined on the basis of geolocation of the measuring device 400. The geolocation may be determined e.g. by a GPS sensor 428 of the measuring device. For example, the database entity 500 or the measuring device 400 may comprise information of outdoor Earth's magnetic field vector in different geographical locations in the world. If the measured indoor EMF vector direction varies significantly, for example by an experimentally obtained amount, from the true outdoor magnetic field direction, then the reliability of the measurement performed may be questionable and the uncertainty measure may be indicate low reliability in the provided EMF vector. This may also aid in detecting if the mapper has traversed (intentionally or unintentionally) the path in an opposite direction than indicated.

In an embodiment, the uncertainty measure for a location may be at least partly determined on the basis of time stamp of the at least one existing magnetic field vector measurement in the location. For example, when the previous EMF vector measurement for the location has been made a long time ago, the uncertainty measure may indicate that the EMF vector provided may not provide as accurate EMF vector values as if the previous EMF vector measurement had been made a short time ago. A short time in this context may be a week or even one month. A long time may refer to several months, for example.

In an embodiment, the uncertainty for each map point is based on a combination of at least two of the above mentioned uncertainty determination criteria. In this embodiment, the combined uncertainty measure may be determined individually/separately for the three angles determining the direction of the EMF vector, and individually/separately for the magnitude of the EMF vector at each map point by applying, e.g., the Gaussian process regression—technique which produces the predictive mean, and the predictive variance, i.e. uncertainty, of the particular, modeled scalar field at each map point. Each of the different parameters affecting the observation noise, and the variance of a particular Gaussian process may be given a weighting factor to yield a combined uncertainty measure, i.e. predictive variance, for a specific map point through the application of the Gaussian process regression. Such weighting factors may be learned through empirical testing, for example.

As a result, the database entity 500, or the measuring device 400, is capable to associate each cell of the EMF map with an uncertainty measure which indicates the reliability of the mapped magnetic field vector at a given location. This may be advantageous so that the person who is to locate himself in the building 100 may know how reliable the location discovery at that part of the building 100 is, for example. On the other hand, this may allow the mapper to define unmeasured spots in the building 100.

Further, one application of the uncertainty measure provided in the magnetic field map may be to extract information on locations where the measurement of the EMF vector may not provide accurate results. This way the algorithm that is to locate the measuring device 400 in the building 100 may apply the uncertainty information when selecting which measuring model to choose or how to adjust the used measurement model. This may denote, for example, the use of different measurement model and/or motion model for one or several location hypothesis, maintained by a multi-hypothesis algorithm such as particle filter, to address the effect of the map uncertainty to the validation of a location hypothesis. After all, for the user who is to locate himself, it is advantageous to make reliable EMF vector measurements in order to accurately compare the measured EMF vector to the EMF vector provided by the map, thus enabling accurate location discovery.

Knowing the uncertainty for each map point is advantageous because then the algorithm used for location estimation may apply different weighting factors for different position hypothesis so that the weighting factors take the uncertainty of each position hypothesis into account. For example, when multi-hypothesis location estimation is applied, there may be a vast number of position hypotheses in the beginning before the procedure converges to the correct (or most likely correct) position hypothesis. Let us assume that some position hypothesis P seems to be not correct because the measured EMF vector does not correspond to the EMF vector provided by an EMF map. However, the EMF map may provide a high uncertainty value for the position hypothesis P. Therefore, the algorithm may not directly discard the position hypothesis because it may be that the EMF map does not provide correct EMF vector for the location P. In fact, it may be possible that the positioning device is in the location P. If the map did not provide for the uncertainty value, the algorithm would most likely disregard the (possibly correct) position hypothesis P already in the beginning.

The measuring device 400, when performing the measurement of the EMF vector may not be oriented according to the world coordinate system. This is shown, as explained, in FIGS. 2B and 2C. In particular, the measuring device 400 may be rotated about at least one of the three axes X, Y and Z. Such deviation from the frame of reference of the floor plan of the building 100 (i.e. the world coordination system) may cause the measured direction of the EMF vector to be erroneous with respect to the world coordination system. Therefore, in an embodiment, either the measuring device 400 or the database 500 may acquire information indicating a three-dimensional orientation of the measuring device 400 at the at least one time instant when the EMF vector is measured, wherein the EMF vector is measured by the measuring device 400 and defined in the frame of reference (X', Y', Z') of the measuring device 400, as shown in FIG. 2C. However, (X',Y', Z') is not the same as (X,Y, Z). Thus, error may occur without adjusting/rotating the acquired EMF vector from the frame of reference (X', Y', Z') of the measuring device 400 to the frame of reference (X,Y, Z) of the floor plan. The adjustment may be made on the basis of the acquired information indicating the three-dimensional orientation (X', Y', Z') of the measuring device 400. From this, the amount of deviation from the world coordinate system may be obtained. As said, in an embodiment, the measuring device 400 is aware of the (X,Y, Z) world coordination system and makes the correction between the frame of references itself before indicating the direction of the EMF vector to the database entity 500. For example, the calibration & correction circuitry 412 may be responsible of making the correction. In another embodiment, the measuring device 400 indicates the possibly erroneous EMF vector direction to the database entity 500 along with information regarding the three-dimensional orientation of the measuring device 400, and the database entity 500 makes the correction/adjustment by the calibration & correction circuitry 514 so as to yield the true direction of the magnetic field vector to be comprised in the generated EMF map.

Figure 7A:
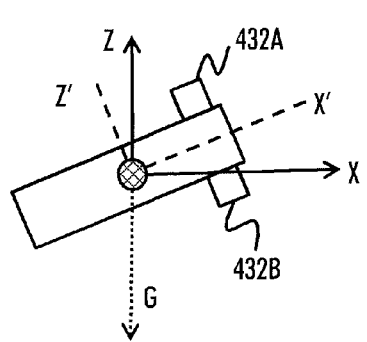
FIGS. 7A to 7C show possible three dimensional orientations of a measuring device.
Figure 7B:
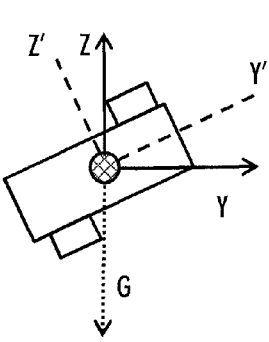

As said, the three-dimensional orientation of the measuring device 400 may be defined by at least one of the following: a rotation with respect to a first horizontal axis (such as X-axis or Y-axis), a rotation with respect to a second horizontal axis (such as Y-axis or X-axis, respectively), and a rotation with respect to a vertical axis Z. Let us consider this in more detail by referring to FIG. 7. In Figures, the solid arrows represent the world XYZ coordinate system and the dotted lines show the frame of reference of the measuring device 400. FIG. 7A shows how the measuring device 400 moving along path 102 of FIG. 1 towards point (X2, Y2) may be rotated about Y-axis. In FIG. 7, the X direction represents the direction from the point (X1, Y1) to the point (X2, Y2). That is, in FIG. 7A, the Y-axis points towards the paper. In FIG. 7B, the measuring device 400 is rotated about X-axis, which points towards the paper. In order to determine the amount of rotation about the Y-axis (FIG. 7A) and about X-axis (FIG. 7B), the measuring device may be in one embodiment equipped with inertial measurement unit (IMU) 422 presented in FIG. 4. The IMU 422 may comprise at least one of the following: at least one acceleration sensor utilizing a gravitational field and at least one gyroscope. The IMU 422 may also comprise other sensors for detecting angular velocities, for example. The acceleration sensor is capable of detecting the gravitational force G. By detecting the acceleration component G caused by the Earth's gravitation in FIGS. 7A and 7B, the measuring device 400 may be able to determine the amount of rotation about axis X and/or Y. In another embodiment, the IMU 422 may detect the movement of the person carrying the measuring device 400. This may advantageously allow the speed and direction of the person to be determined, thus resulting in determination of measuring device 400 location along the measurement path at a given time. Alternatively, an average speed determined from a measurement distance and measurement time may aid in locating the measuring device 400 along the measurement path at any given time. In yet another embodiment, the IMU 422 may detect the movement of the person so as to use the data as a fusion sensor data in location discovery/tracking which is based on EMF and on an inertial navigation system (INS) applying the IMU 422. Such a fusion sensor type of location discovery and tracking may provide more accurate results than either of them alone.

Figure 7C:
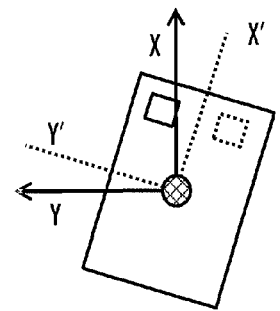

Although the rotation about the X and Y axis may in general be correctable because the global reference (the gravitational force G) is present, the rotation about the Z-axis as shown in FIG. 7C may not be corrected as easily. This may be due to lack of global reference. Relative rotations may be detected by using the at least one gyroscope comprised in the IMU 422. However, the rotation estimate, produced by integrating over time the angular velocity measurements acquired by the gyroscope, will drift over time due to, for example, sensor inaccuracies and gyroscope biases if the rotation estimate is not aligned to the global reference direction in a regular basis. Therefore, in an embodiment, the database entity 400 may acquire, from the measuring device 400, information indicating a virtual measurement path along which the measuring device 400 measured the EMF vector. Let us take a look at FIG. 6A which shows one possible virtual measurement path marked with a dashed line 606. The virtual measurement path 606 may be defined in the frame of reference of the floor plan, that is, by XY coordinates. The path 606, as shown, need not be direct but the path may comprise curves, or alike. Naturally direct paths are applicable as well. The database entity 500 may then determine a tangent vector, shown with a dotted line 608, of the indicated virtual measurement path 606 in the direction of movement of the measuring device 400 at a given location (X1,Y1). The tangent 608 gives a reliable indication regarding what the rotation about the vertical axis Z of the measuring device 400 is at any given point (X1, Y1) along the virtual measurement path 606. That is, the measuring device 400 is assumed to be oriented towards the tangent 608 when moving in the measurement path 608. The information extracted by using the tangent 608 and the information provided by the gyroscope may together form powerful means for determining the deviation from the world XY coordination system. Therefore, the EMF vector may be rotated to the world XYZ coordinate system by using the three-dimensional orientation information provided by the gravitational field detected by the IMU 422, and, optionally, by using the information provided by the tangent vector 608 of the measurement path 606 in the sample location (X1, Y1).

In an embodiment, when EMF map data for the location is available, the EMF map data may provide another global reference applicable for correcting/adjusting/rotating the three-dimensional orientation. Namely, the global reference from the EMF map may be the true direction of the EMF vector. For example, when there are two position hypotheses, the three-dimensional orientation adjustment at the correct location hypothesis performs better than at the false location hypothesis. This is because, when correcting the rotation based on Earth's gravitational force G, the direction of the measured EMF vector should approach the true EMF vector inclination. If this is not the case, the position hypothesis may be determined as not correct or the probability of the reliability of the position hypothesis may be given a low value. This is because at a false position hypothesis, a wrong EMF vector direction may be used. On the contrary, the orientation adjustment at the correct position hypothesis based on G, makes the measured direction and true inclination to be closer to each other. Then, the three-dimensional orientation correction based on may be conducted, i.e. the three-dimensional orientation of the measuring device 400 with respect to the rotation about the Z-axis may be corrected at least partly based on the true direction of the EMF vector provided by the EMF map. The correction may be performed by the measuring device 400 or by the database entity 500. Such three-dimensional orientation correction may be conducted even off-line if the measuring device 400 is equipped with the EMF map data. This way the three-dimensional orientation of the measuring device 400 may be adjusted properly and correct values of EMF measurement may be obtained.

As is clear from the above, the measuring device 400 may itself determine a measurement path or area along which or where the EMF vector measurements are to be conducted. For this, the measuring device 400 may comprise the measurement path determination circuitry 410. However, in another embodiment, the database entity 500 may provide at least one candidate virtual measurement path or area to the measuring device 400 along or in at least one of which the measuring device 400 is suggested to measure the magnetic field vector. For this, the database entity 500 may comprise the measurement path determination circuitry 510. This may be advantageous so that the measuring device itself need not use resources in determining appropriate area to measure. It should be noted that the area to be measured may advantageously comprise areas where no measurements have yet been performed. The selection of the at least one (candidate) virtual measurement path or area may be done automatically and it may be based at least partly on the location specific uncertainty of the EMF vector. Such entropy based determination of candidate measurement paths or areas may be advantageous so that measurement priority is given to areas having lowest reliability of correct EMF vectors in the EMF map.

FIG. 6B depicts how the virtual measurement path 610 may be determined by the measuring device 400. The figure represents a user interface 408 which the mapper may apply in controlling the measuring device 400. It may be assumed that the measuring device 400 has received information regarding existing measurement points in a specific map area or operational environment. The information may also represent at least one uncertainty area of the room based on the uncertainty of the EMF vector in the location. Such uncertainty area is depicted with reference numeral 612. The mapper may himself draw the virtual measurement path 610 in the frame of reference of the floor plan. The mapper may for example draw a line between the start point and the end point and then apply curves to the direct line in order to reach the curved measurement path 610 shown in FIG. 6B. Such drawing may take place by using a cursor or a finger (in case of touch screen), which are depicted with reference numerals 614A and 614B. The direction of the movement may be determined by the chronological order in which the two points (start and end point) were given. Further, the mapper may point individual measurement points in the map in which points the mapper either performed or is going to perform the EMF vector measurements. The individual points may be determined in the frame of reference of the floor plan.

In one embodiment, the measuring device 400 comprises at least one camera 432, 432A, 432B, as shown in FIGS. 4, 6B and 7. The measuring device 400 may thus be configured to capture at least one image of the surroundings of the location in the building 100 where the EMF vector is measured, wherein the at least one image depicts at least one of the following: a floor and a ceiling, at least one wall. The at least one image may be captured when the measuring device 400 is at a predetermined three-dimensional orientation detectable by the IMU 422, for example. This may ensure that the image is taken in a desired direction, such as towards the floor or the ceiling. In one embodiment, the measuring device 400 is equipped with at least two cameras pointing in substantially opposite directions, as shown in FIGS. 6B and 7 by reference numerals 432A and 432B. This may allow the measuring device 400 to simultaneously capture two images, one from the floor and one from the ceiling. The measuring device 400 may capture the image(s) at the same location where the EMF vector is measured. The database entity 500 may acquire the at least one image or image feature associated with a certain EMF vector and the uncertainty measure acquired from the measuring device 400. The database entity 500 may store the data in the fusion sensor data unit 544 of the memory 504. The database entity 500 may then use the image or image feature obtained in validation of the measurement data, in determining the uncertainty measure for the location, etc. The acquired image or image feature data may further be beneficial in determining where along the measurement path the mapper is at a certain point of time, thereby improving the reliability of the measured EMF vectors. The acquired image or image feature data may also be beneficial in determining the three-dimensional orientation of the measuring device 400. The image or image feature may reveal the surface texture of the building, thus providing reliable source for fusion sensor positioning, validation/authentication of the acquired EMF vectors, etc. In an embodiment a control line, such as a white line, is arranged to the floor, ceiling, or wall of the path where the measurements are conducted. Such a control line may aid in tracking the movements of the measuring device, at least when the measuring device captures images along the measurement path. The control line may be equipped with control points which are distinguishable. Such a control line may aid the mapper to stay on the desired and correct measurement path and the movements of the mapper may be more easily detected along the measurement path.

Further, in an embodiment, the database entity 500 may provide, on request, the at least one image or image feature to a positioning device who is to determine its location inside the building, wherein the at least one image is usable in location discovery of the positioning device in the building as part of fusion sensor technique. In other words, it may happen that the EMF vector measured does not accurately locate the positioning device in one specific location, for example, when the EMF map comprises two substantially identical EMF vectors at two separate locations. In such situation, the received image or image feature may distinguish the two separate locations. It may be that the positioning device takes images from the ceiling, for example. Then, the positioning device may compare the captured image or image feature to the received image related information, and correctly locate itself as a result. It may be that the comparison result may affect the probability of having a correct position hypothesis, for example. Thus, the image based location tracking may be used in addition to the EMF based location tracking to enhance the accuracy. Location tracking may also be performed by using the images or image features. The image feature may be for example a local binary pattern (LBP) histogram, a color histogram, etc. Communication of only the image feature instead of the whole image results in reduced amount of communication resources applied and possible reduced transmission time.

Figure 8:
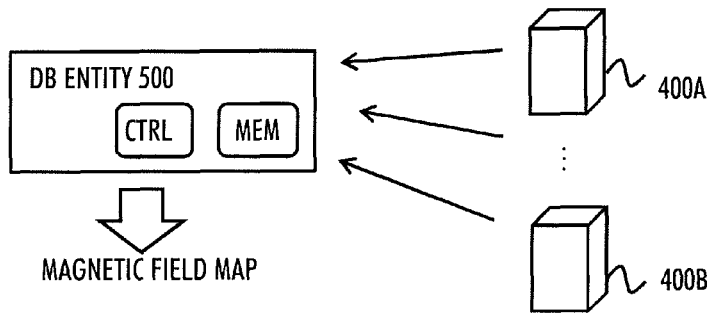
FIG. 8 shows two measuring devices providing data to the database entity, according to an embodiment.

In an embodiment the database entity 500 may acquire information indicating the EMF vector in at least one known location inside the building 100 from at least two different measuring devices 400A and 400B, as shown in FIG. 8. The database entity 500 may then combine the acquired information to represent the magnetic field vector and the uncertainty measure of the magnetic field vector, each as a single vector/scalar, in the at least one known location of the EMF map. The combination may be performed individually/separately for the three angles determining the direction of the EMF vector, and individually/separately for the magnitude of the EMF vector at each map point by applying, e.g., Gaussian process regression—technique which produces the predictive mean, and the predictive variance, i.e. uncertainty, of the particular, modeled scalar field at each map point. Each measuring device 400A and 400B may contribute individually to the observation noise, and the variance of a particular Gaussian process used to model a particular scalar field. Correspondingly, each device and/or observation may be given a weighting factor to yield a combined uncertainty measure, i.e. predictive variance, for a specific map point through the application of the Gaussian process regression.

As shown, the crowd sourcing approach may be efficiently performed by a vast number of mappers around the globe. However, it may be that the provided measurements are not all valid which may be due to malfunctions of the measuring device, electrical operation of the measuring device, intentional or unintentional acts of the of the user who is associated with the measuring device, etc. Therefore, in an embodiment, the database entity 500 may, by using the validation circuitry 512, determine whether a certain acquired EMF vector is valid or not on the basis of at least one of the following: at least one acquired image or image feature of the surroundings of the location where the certain EMF vector is measured, statistical properties of the certain EMF vector measured, amount of variance in local motion data provided by one or more inertial sensors coupled to the measuring device 400, a difference between the expected direction of the EMF vector and the measured direction of the certain EMF vector, a determined average speed during the measurement of the certain EMF vector, an estimated rank of the mapper (user) associated with the measuring device 400 that measured the certain EMF vector, positioning performance of the EMF map based on the acquired EMF vector.

Let us take look at these individually. In an embodiment, the database entity 500 may make a decision of the validity of the acquired EMF vector at least partly on the basis of at least one acquired image or image feature of the surroundings of the location where the certain EMF vector is measured. As explained earlier, the image or image feature acquired may indicate the location where the EMF vector is measured. It may be, for example, determined does the acquired image corresponds to the location where the EMF vector is presumably measured or does the three-dimensional orientation of the measuring device 400 fulfill certain criteria. The database entity 500 may, alternatively or in addition to, compare the image features to the image features associated to EMF vector data acquired by other users on the same or nearby area, and determine if the data is valid or not based on the statistical similarity of image features associated to different EMF vector data acquired by other users from the same or nearby area.

In an embodiment, the database entity 500 may make a decision of the validity of the acquired EMF vector at least partly on the basis of statistical properties of the certain EMF vector measured. The statistical properties may indicate, for example, amount of variance in local motion data provided by one or more inertial sensors 422 coupled to the measuring device 400. When the movement is rapid and intense, the validation circuitry 512 may decide to consider the EMF vector obtained invalid. This is because the expected amount of local motion is relatively low, assuming the mapper has performed the measurements with a required concentration.

In an embodiment, the database entity 500 may make a decision of the validity of the acquired EMF vector at least partly on the basis of a difference between the expected direction of the EMF vector and the measured direction of the certain EMF vector. The expected direction may be obtained on the basis of a priori knowledge about the location of the building and the known direction of earth's magnetic field on the area where the building is located. This may be obtained e.g. from GPS sensor 428, such as a GPS antenna, of the measuring device 400. The measuring device 400 may cause transmission of the expected EMF vector direction to the database entity 500. This may be used in determining whether the received data is valid or not, for example. Alternatively, the database entity 500 may comprise or access geomagnetic information, which may indicate the direction of EMF vector at any given geolocation. In this case, the measuring device 400 need only transmit the geolocation, not the expected direction. For example, the virtual path indicated by the mapper may be assigned an expected direction of the EMF vector taking into account the frame of reference of the floor plan of the building. The direction of the EMF vector measured along the path should statistically correspond to the expected direction. This may ensure that the data is measured in the direction as indicated.

In an embodiment, the database entity 500 may make a decision of the validity of the acquired EMF vector at least partly on the basis of a determined average speed during the measurement of the certain EMF vector. The average speed may be determined based on the distance and time used for the measurement process. When the determined average speed indicates a speed exceeding a predetermined threshold, the acquired data set may be determined as invalid. For example, if the time series of the magnetic field vector is 2 seconds long, but the indicated measurement path is 20 meters long, it may be determined that the data is invalid.

In an embodiment, the database entity 500 may make a decision of the validity of the acquired EMF vector at least partly on the basis of an estimated rank of the mapper (user) associated with the measuring device 400 that measured the certain EMF vector. In other words, if the mapper is a priori known as a reliable source of EMF vector and uncertainty data, the threshold for determining the data received from the user invalid is relatively high.

In an embodiment, the database entity 500 may make a decision of the validity of the acquired EMF vector at least partly on the basis of positioning performance of the EMF map based on the acquired EMF vector. For example, when the acquired data is used in the EMF map and the data provides accurate location discovery, then the data may be determined as valid. As a further example, in an embodiment, at least two sets of statistically conflicting data associated to the same area/location may be evaluated based on statistical analysis of the positioning performance of each data set. The data set may include the measured EMF vector and the uncertainty measure, for example. Thus, when the first data set provides good positioning capabilities, according to empirical experiment, for example) and the other data set does not, the first data set may be selected as the correct one. The good positioning capability may be determined based on statistical measures, for example.

The database entity 400 may then further decide either to remove the certain magnetic field vector from the acquired information or to utilize the certain magnetic field vector in generation of the indoor magnetic field map, wherein the decision is based on the validity determination. This way the changes of providing valid and reliable EMF vector data in the EMF map may be increased, which may be important in the crowd sourcing approach.

In an embodiment, the measuring device 400 applies an odometer 424 in determining the movement of the measuring device 400. Such fusion sensor approach may further enhance the reliability of the acquired data usable for the EMF map. The movement may comprise information indicating the position, the orientation and the speed of the measuring device 400 as a function of time, for example. The odometer 424 may be used to determine the movement from a tire coupled to the measuring device 400 or from a surface moving with respect to the moving measuring device 400, such as from the floor. The measuring device 400 may be coupled to a tire when the measuring device 400 is mounted on a shopping cart, for example. The shopping cart may also provide stable mounting for the measuring device 400 and may improve the changes for correct three-dimensional orientation of the measuring device 400. In an embodiment, the shopping cart may be equipped with several magnetometers which are separated by a predetermined distance, such as the length of the shopping cart. This may provide more information and thus more accurate EMF vector measurements. The measuring device 400 may then transmit the odometer data to the database entity 500 which may process the data in the fusion sensor processing circuitry 518 and finally apply the odometer data, for example, in determining validity of the acquired EMF vector.

In an embodiment, the database entity 500 and, in particular, the user rank circuitry 520 may rank users, each user being associated with at least one measuring device 400 used in measurement of a EMF vector. The ranking may be performed on the basis of at least one of the following: validity determination of the acquired magnetic field vectors from a specific user, utilization rate of data acquired from a specific user, amount of collected data by a specific user, amount of references to social network services from a specific area where measurements have been done by a specific user, amount of advertisements associated to a specific area where measurements have been done by a specific user, amount of revenue associated to a specific area where measurements have been done by a specific user. Let us next consider these individually.

In an embodiment, the ranking may be based at least partly on validity determination of the acquired magnetic field vectors. Thus, the rank for the mapper may be affected by the uncertainty associated with the mapper. For example if the validation determination at least most of the times indicates valid data from the specific user, the user may be given higher rank than a user associated often with invalid data.

In an embodiment, the ranking may be based at least partly on utilization rate of data acquired from a specific user. For example, if a certain user has contributed in generation of EMF map for a location which is often used (utilized) for location discovery/tracking purposes by clients, the certain user may be given a high rank.

In an embodiment, the ranking may be based at least partly on amount of collected data by a specific user. In other words, when a specific user has provided a lot of EMF map data, the specific user may be given higher rank than a user who has provided less EMF map data. This may also take the validation determination into account.

In an embodiment, the ranking may be based at least partly on amount of references to social network services from a specific area where measurements have been done by a specific user. The social network may be for example, Facebook, Twitter, Foursquare, etc. The reference may refer to check-ins to the social network, comments posted to the social network, etc. For example, when such references origin from a certain area, it may be assumed that such area is densely populated with socially active users, possibly in a need of location discovery/tracking and most likely associated with a device capable of such location discovery/tracking. Thus, the user who has contributed in generation of the EMF map data for the specific area may be given a high rank as the potential utilization rate of the map data is high.

In an embodiment, the ranking may be based at least partly on amount of advertisements associated to a specific area where measurements have been done by a specific user. Similarly as for the social references, the amount of location-based advertisements, such as shopping advertisements, for the specific area may indicate high amount of people in the commercially important area. This may affect the rank of the mapper. Highly ranked mappers may have generated map data for area with high density of people, and/or with high commercial potential. As a further example, it may be that the mappers who have generated EMF map data for an area where advertisers are eager to provide advertisements, such as shops, airports, railway stations, etc., have high rank. The advertisers may not necessarily provide visual advertisements in the buildings, but associate the building or area with mobile advertisements. In this example, when a mobile device enters the area, the mobile device may receive a mobile advertisement.

In an embodiment, the ranking may be based at least partly on amount of revenue associated to a specific area where measurements have been done by a specific user. This may refer to amount of revenue obtained from people, or advertisers who apply the data of the database entity 500 in location discovery/tracking. As said, the database entity 500 may comprise EMF map data for a vast number of indoor areas. A user in a need of location tracking may request such EMF map data from the database entity 500. As an exchange of the EMF map data obtained, the user may be required to pay for the data. Therefore, a mapper, who has provided map data for an area which produces high income, may be assigned a high rank.

The user (mapper) rank may be used as a criterion to select and weight data samples in map regression and interpolation. For example, when map data is received from many users, the weighting of the map data may take into account the ranks of the many users. The data provided by user with high rank may be weighted more than the data provided by a user with a low rank.

In an embodiment, upon determining that the measuring device 400 is at a predetermined location where a true EMF vector is known, cause at least one of the following to take place: a calibration process of at least the measured EMF vector of the measuring device 400, wherein the calibration process applies a scaling parameter determined from the difference between the measured and true magnetic field, connection establishment between the data base entity 500 and the measuring device 400 in order to actuate a software for EMF vector measurements and/or to enable the communication of the measured at least one EMF vector from the measured device 400 to the data base entity 500. The predetermined location where a true EMF vector is known may be obtained in many ways. In an embodiment, the true magnetic field is reliably measured for the location, for example during mounting of equipment in the predetermined location. The true magnetic field values at the predetermined location may be updated according to certain appropriate intervals. The true magnetic field data for the location may comprise, the strength, bias, i.e. offset, and the direction. The true magnetic field vector may be stored in a memory. The predetermined location may be for example marked so that the mapper needs to place his/her measuring device 400 at the predetermined location. The predetermined location may comprise information of the three-dimensional orientation of the measuring device 400 to be applied when placed in the predetermined location. For example, the predetermined location may be on the top of a table and the true magnetic field information may be given to the mapper. The true magnetic field information may be given orally, visually, for example.

Figure 9:
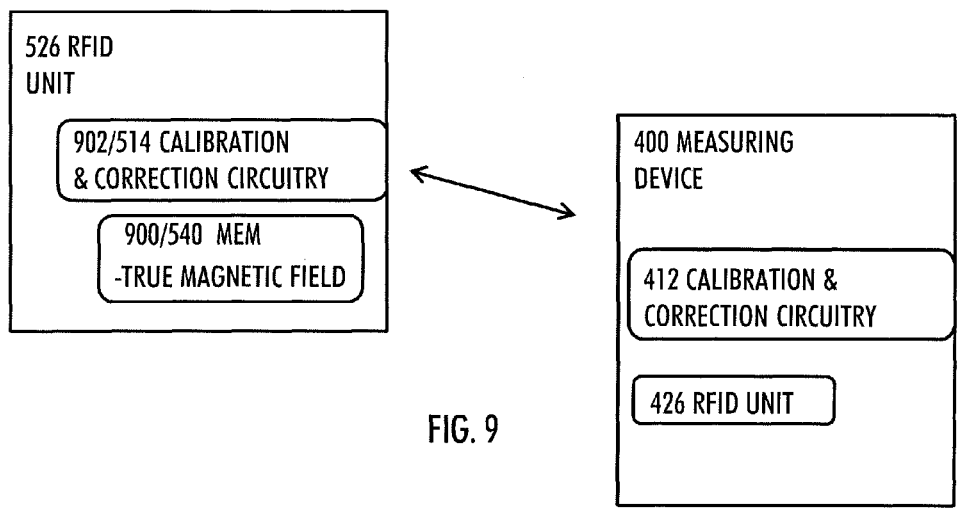
FIG. 9 illustrates calibration/correction procedure, according to an embodiment.

In an embodiment, however, as shown in FIG. 9, the predetermined location comprises a first radio frequency identification (RFID) unit 526. The first RF unit 526 may determine that the measuring device 400, comprising a second RFID unit 426, is coupled to the first RFID unit 526, wherein the true magnetic field at the location of the first RFID unit 526 is known. Values of the true magnetic field, such as the strength and direction, may be stored in the memory 900 operatively coupled to the first RFID unit 526. When a connection between the RFID units 426 and 526 is established, it may be determined that the measuring device 400 (comprising the RFID unit 426) is at the close vicinity of the first RFID unit 526, i.e. at the predetermined location. Then a calibration process may be carried out by the calibration & correction circuitries 902, 412. The first RFID unit 526 may be operatively connected to and/or comprised in the database entity 500. In such a case, the memory 540 and the calibration & correction circuitry 514 of the database entity 500 may be utilized. However, the first RFID unit 526 may also be an independent entity in the system for generating indoor EMF based map.

The calibration process may be carried out in various manners. Let us consider the case where two RFID units 426 and 526 are connected to each other. The first RFID unit 426 may receive the true magnetic field information from the second RFID unit 526. Then the measuring device 400 may apply the received information in calibration of the magnetometer in order for the magnetometer to provide accurate and true EMF vector data. Alternatively, the measuring device 400 may apply the received information in correcting each value provided by the magnetometer so as to provide accurate and true EMF vector data to the database entity 500. In another embodiment, the second RFID unit 526 may cause the calibration of the measuring device 400 or inform the database entity 500 of the correction that needs to be used for the EMF vector data received from this specific measuring device 400. It should be clear that the difference between the true and measured EMF vectors may be determined at the measuring device 400 or at the second RFID unit 526, as the case may be.

The calibration/correction may be for the strength of the EMF vector. Alternatively, or in addition to, the calibration/correction may be for the direction of the EMF vector, or for the bias (offset) of the EMF vector. For calibration/correction of the direction, the calibration process applies a rotation to the coordinate system of the magnetometer determined from the difference between the measured and true magnetic field vector directions. The calibration process may also calibrate/correct data related to the direction and/or strength of the measured acceleration vector representing the direction of the gravitational force G. For this, the true value for G may be previously determined for the predetermined location.

In an embodiment, the calibration process may take into account the electrical state of the measuring device 400 and/or the mechanical state, i.e. a worm factor, of the measuring device 400. For example, the measuring device and, in particular, the calibration &correction circuitry 412 may conduct real-time calibration/correction for the measured EMF data depending on the electrical state of the measuring device 400. For this, the measuring device 400 may be precoded with information on how much each electrical state distorts the true EMF vector value. The worm factor may affect the measured EMF vector so each worm factor may have its own correction values to be applied.

In an embodiment, the software for the EMF vector measurements, virtual measurement path selection, etc. may be started when the measuring device 400 is at the predetermined location. This may be possible for example when the RFID units 426 and 526 communicate accordingly. In an embodiment, the connection to the database entity 500 may be established when the measuring device is at the predetermined location. This may also be done via appropriate commands from the first RFID unit 526 and/or by using information acquired from the first RFID unit 526, such as the internet protocol address (IP) of the database entity 500. The predetermined location may also be beneficial in allowing the mapper to know its exact location in the building. This allows the mapper to select a measurement path/area and be able to identify correctly the to-be-measured or already measured path/area.

In yet another embodiment, the first RFID unit 526 facilitates location discovery/tracking of a user by allowing the user to initially locate himself in the building. When the first RFID unit 526 is operatively connected to the database entity 500, the first RFID unit 526 may also cause transmission of the EMF map data to the positioning device of the user who wishes to perform EMF map based location discovery/tracking.

In an embodiment, the database entity 500 may acquire at least one indoor magnetic field map update with respect to at least one of the magnetic field vector and the uncertainty measure in at least one location from a positioning device that is to be located in the building, such as in the building 100. In other words, the mapper(s) who provided the map data in the first place may not be the only one contributing to the map data in the building. A user of a positioning device applying EMF based location discovery/tracking application may also contribute to the map by providing measured EMF vector values to the database entity 500. The database entity 500 may then update the existing EMF map of the building based on the acquired EMF vector values. The uncertainty associated with the location may also be updated. For example, when more data is acquired for a specific location, the more reliable the EMF map is for the location. Also, when it is determined that the location discovery is not working or is providing poor results for a certain location, then the uncertainty measure associated with the EMF data for that location/area may be adjusted accordingly. Thus the updated uncertainty measure and/or EMF vector in the EMF map may be a function of the existing value and the newly acquired value from the positioning device that is performing the EMF based location discovery/tracking.

In an embodiment, the EMF map may be enlarged when a mapper provides data to an area where the current EMF map does not yet provide information. Such new data may be obtained from the original mapper or from any positioning device that is locating itself by using the EMF based location discovery/tracking. In the latter case, the positioning device need not follow the virtual measurement paths provided by the database entity 500, but the positioning device may move more freely. When the positioning device moves away from a previously measured path, for example, the deviation from the path may be detected and the EMF vectors provided by the positioning device may be added to the EMF map, thus updating the EMF map. The movement of the positioning device may be acquired from inertial sensors coupled to the positioning device after the positioning device has moved away from the existing EMF map area. However, it may be that the uncertainty of the EMF vectors provided by the positioning devices may be assumed low for only a short duration of time after leaving the EMF map area because the movement of each positioning device may be unpredictable after deviating from the tracked path. Even so, updates of the EMF map may be acquired in small steps when many positioning devices move in the building randomly.

In an embodiment, the floor plan of the building is known beforehand from a corresponding database, for example. However, in an embodiment, the floor plan of the building may be formed by the measuring device 400 simultaneously as the EMF vectors are measured. This may be conducted so that the movement data is acquired from inertial measurement unit and/or from odometer. The movement data of the measuring device may indicate the length of the moved segment, whether the measuring device turned along the segment, for example. This may be used to generate the floor plan. The EMF vectors may be known at least at the beginning and at the end of previously measured segments. These EMF vectors may be known to position the measuring device along a new segment, wherein the previously measured segments may either start or end at some point along the new segment. This may aid to locate the cross corridors with respect to the new segments.

In an embodiment, the EMF map data provided for one building 100 by multiple measuring devices 400, possibly associated with multiple mappers, is made commensurable. In an embodiment, the database entity 500 may acquire information related to magnetic field vector measurements from a plurality of measuring devices 400, wherein the magnetic field vector measurements correspond to at least one location where the measurement paths of the measuring devices 400 have overlapped. In other words, the measuring devices 400 may provide EMF map data for an area where multiple measuring devices 400 are/have been moving and crossed each other's paths. In practice, if several measuring devices 400 have conducted EMF measurements in the building and the measurements paths applied by the multiple measuring devices 400 overlap at some locations, the EMF vector measurements provided by the measuring devices 400 may still differ in the location of the overlap due to different calibrations of the measuring devices, for example. The measuring devices 400 may also provide the uncertainty measure of the provided EMF vector measurement, as described above. The database entity 500 may estimate a true magnetic field reference vector from the acquired magnetic field vector measurements based on at least one predetermined criterion. The at least one predetermined criterion may result in estimating the true magnetic field reference vector at least partly on the basis of an acquired magnetic field vector—specific uncertainty measure. Thus, for example, the least unreliable data set (EMF vector) may be selected (estimated) as the reference EMF vector. Alternatively, the at least one predetermined criterion may result in selecting an average magnetic field vector as the true magnetic field reference vector. Yet, alternatively, one of the acquired magnetic field vector measurements may be randomly selected as the true magnetic field reference vector. Thereafter, the database entity 500 may compare the other non-reference magnetic field vector measurements at the location of the overlap to the true magnetic field reference vector.

From the comparison result, calibration for the other acquired, i.e. non-reference, magnetic field vector measurements from the location of the overlap may be determined. For example, a data set-specific calibration parameters may be determined for each of the other non-reference data set corresponding to different non-reference measuring devices 400. The calibration parameters may be selected so that the calibrated EMF vectors from the non-reference devices match to the true magnetic field reference vector. The calibration parameters may comprise scaling factor and/or bias vector, for example. The scaling for the reference data set (i.e. the reference EMF vector) may apply scaling factor of 1, for example. For another data set corresponding to non-reference measuring device, the scaling factor may be something other than 1. In case where the true magnetic field reference vector is the average of the acquired magnetic field vector measurement, the true magnetic field reference vector may not perfectly match with any of the acquired EMF vector measurements. In this case, the scaling factor may other than 1 for every acquired EMF vector measurement. The calibration may be determined by applying a linear or non-linear least squares method, for example. In one embodiment, calibration for magnitude is obtained by determining the difference between the EMF magnitude values between the reference EMF vector and a non-reference EMF vector.

By using these calibration parameters, each data set may be made commensurable and, thus, usable for the EMF map generation. The database entity 500 may apply the determined calibration parameters to all magnetic field measurements acquired from the non-reference measurement devices corresponding to the non-reference magnetic field vector measurements in order to acquire commensurable and usable magnetic field vector measurements for the indoor magnetic field map generation from each of the plurality of measuring devices (400). Thus, in addition to the measuring device corresponding to the true magnetic field reference vector (i.e. a reference measuring device), the EMF data acquired from the non-reference measuring devices may be used for the EMF map. Such (re)calibration may be needed because each measuring device 400 may provide different EMF measurements due to, for example, different calibration process the measuring device 400 has gone through, different mounting implementation (for example, separate device vs. shopping cart mounted device), etc. For example, the calibration of two devices may have been conducted in different magnetic environments. Also, when one measuring device is mounted in the shopping cart, for example, and the other measuring device is not, the EMF measurements provided may vary.

Figure 10:
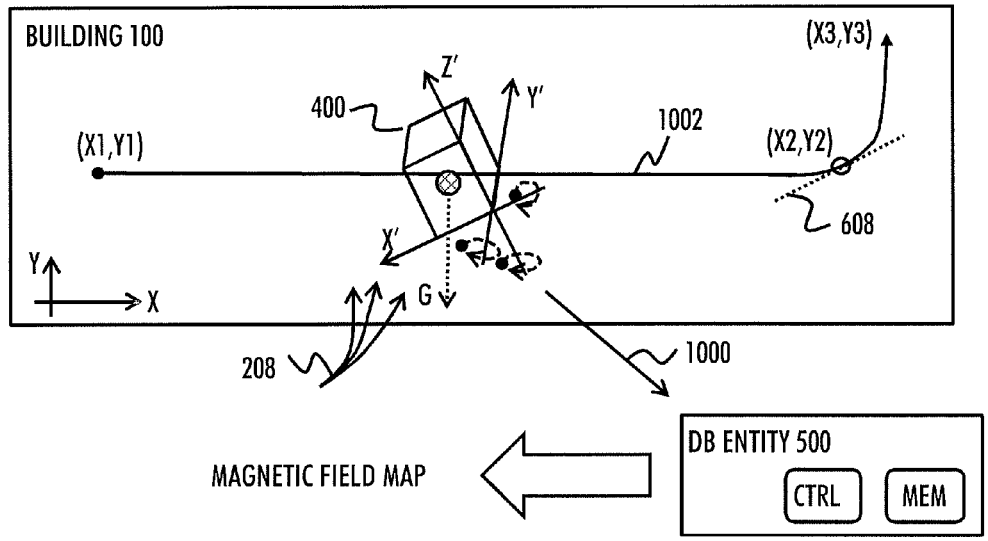
FIG. 10 shows system for generating an indoor magnetic field map, according to an embodiment.
Figure 11:
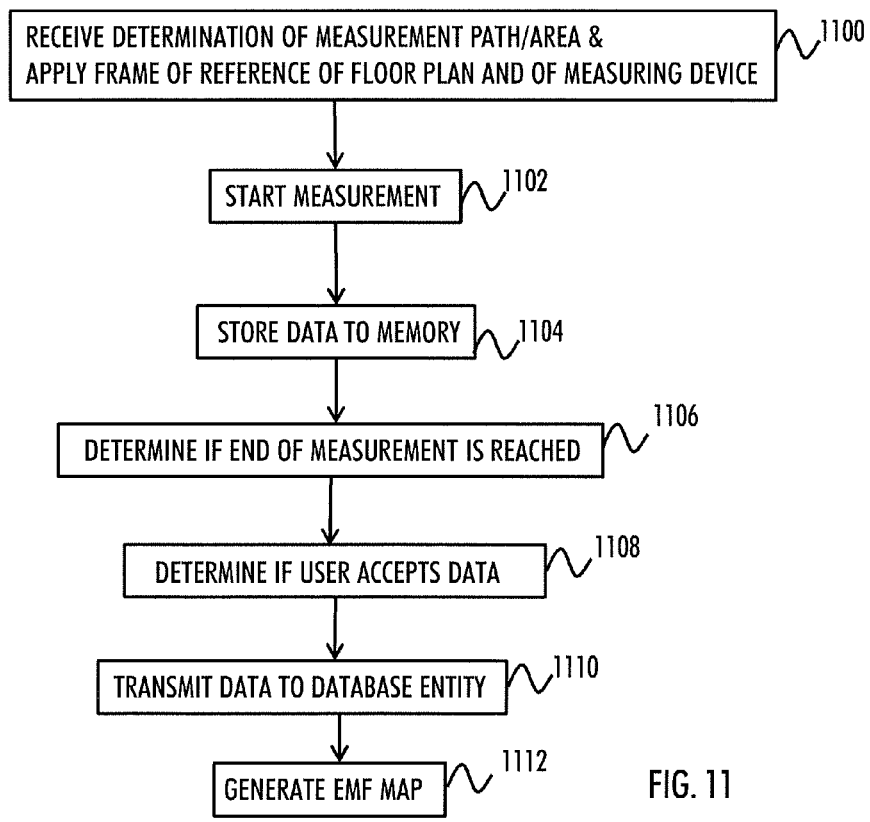
FIG. 11 shows a method for generating the indoor magnetic field map, according to an embodiment.

In an embodiment, a system for generating an indoor magnetic field map for the building 100 is provided. The system may comprise at least one measuring device 400 and the data base entity 500. Such a system is for clarity shown in FIG. 10. The measuring device 400 having a certain frame of reference X', Y', Z' compared to the frame of reference of the floor plan X, Y, Z may traverse a path 1002 from (X1, Y1) to (X3, Y3) via point (X2, Y2). The measuring device 400 may measure the EMF vector 208 along the path 1002 and provide the measured data to the database entity 500 along with information relating to uncertainty measure of the measured EMF vector. The transmission of data may be made via wireless radio link 1000. As said, the measuring device may be a mobile phone equipped with at least magnetometer, for example. The database entity 500 may then generate the indoor magnetic field map for the building 100 on the basis of at least the acquired information and the floor plan, wherein the indoor magnetic field map comprises the magnetic field vector and the uncertainty measure of the magnetic field vector for at least one location inside the building 100. When determining the uncertainty measure, the tangent of the measurement path may be used as described earlier, for example. Further, the database entity 500 may provide, on request, at least part of the generated indoor magnetic field map to a positioning device that is to determine its location inside the building 100.

In an embodiment there is provided a method for generating an indoor magnetic field map for the building. The method may start by the user determining a measurement path/area in step 1100. The path or area to be measured may be bind to the frame of reference of the floor plan of the building. Also it may be checked that the frame of reference of the measuring device measuring the EMF vectors in the area fulfills certain predetermined criteria. This may be made by using at least one accelerometer and at least one gyroscope, for example. In step 1102, the measurement process may be initiated and EMF vector data sample measured may be stored in the memory in step 1104. The data may comprise the measured EMF value and possible also information relating to the uncertainty of the measured EMF vector, such as the three-dimensional orientation of the measuring device. The start of the measurement may require an additional approval from the mapper, or it may be started automatically. In step 1106 it is determined if an end of the measurement is reached. This may be known by a user inputting such information or by the fusion sensor data indicating such. The fusion sensor data may comprise, for example, IMU, images, odometer data, other location tracking system data acquired by the RF based location tracking sensor 430 of FIG. 4, etc. If the answer for the determination in step 1106 is positive, the method proceeds to step 1108 where it is determined does the user accept the data measured. However, in an automated process, this step may be omitted. If the answer to the determination of step 1106 is negative, the method returns to step 1104. As said, in step 1108 it is determined does the user accepts the data measured. If the answer is positive, the data is sent to a database entity in step 1110 and the database entity may generate an EMF map based on the data received in step 1112. However, if the answer to determination in step 1108 is negative, the method proceeds back to step 1000.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(sysoftware including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configured to carry out embodiments of any of the FIGS. 1 to 11. In an embodiment, the at least one processor 402 or 502, the memory 404 or 504, respectively, and a corresponding computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor and at least one memory including a computer program code, wherein the at least one memory and the computer program code are configured to, with the at least one processor, cause the apparatus to perform at least operations comprising:
acquiring an indication of at least one magnetic field vector measured by a mobile device indoors, wherein each magnetic field vector represents magnitude and direction of the Earth magnetic field affected by the local structures of a building;

acquiring at least one image or image feature of at least one image, wherein each image is captured by the mobile device in the building where the at least one magnetic field vector is measured, and wherein the mobile device is equipped with at least two cameras and the mobile device is configured to capture at least two images with the cameras;

applying each of the at lest two images in positioning the mobile device in the building; and applying the at least one magnetic field vector and the at least one image or image feature in positioning the mobile device in the building.

2. The apparatus of claim 1, wherein at least one image or image feature is associated with the same unknown location of the building where at least one magnetic field vector is measured.

3. The apparatus of claim 1, wherein the at least one image depicts at least one of the following: a floor and a ceiling, at least one wall.

4. The apparatus of claim 1, wherein the image feature comprises a local binary pattern (LBP) histogram of the corresponding image.

5. The apparatus of claim 1, wherein applying the magnetic field vector in the positioning comprises comparing the at least one magnetic field vector to at least a part of a pre-stored Earth magnetic field map of the building.

6. The apparatus of claim 1, wherein applying the at least one image or image feature in the positioning comprises comparing the at least one image or image feature to a pre-stored image or image feature of the building.

7. The apparatus of claim 1, wherein the apparatus is further caused to perform:
applying the acquired at least one image or image feature in determining a three-dimensional orientation of the mobile device.

8. The apparatus of claim 1, wherein the at least one image is captured when the mobile device is at a predetermined three-dimensional orientation.

9. The apparatus of claim 8, wherein the apparatus is further caused to perform:
detecting, on the basis of readings of an inertial measurement unit of the mobile device, that the mobile device is in the predetermined three dimensional orientation.

10. The apparatus of claim 1, wherein the apparatus is comprised in a server on a network, and the apparatus is further caused to perform:
storing an Earth magnetic field map of the building;
receiving the indication of the at least one magnetic field vector from the mobile device;
receiving the at least one image or image feature from the mobile device; and
positioning the mobile device in the building on the basis of the received at least one magnetic field vector, the stored Earth magnetic field map, and the received at least one image or image feature.

11. The apparatus of claim 10, wherein the apparatus is further caused to perform
transmitting a location estimate to the mobile device.

12. The apparatus of claim 10, wherein the apparatus is comprised in a server on a network, and the apparatus is further caused to perform:
storing at least one image or image feature of the building; and
positioning the mobile device in the building further on the basis of a comparison between the received at least one image or image feature and the stored image or image feature of the building.

13. The apparatus of claim 1, wherein the apparatus is comprised in the mobile device, and the apparatus is further caused to perform:
measuring the at least one magnetic field vector;
capturing the at least one image;
receiving at least part of the Earth magnetic field map of the building from a server; and
positioning the mobile device in the building on the basis of the following: measured magnetic field vector, the received at least part of the Earth magnetic field map, and the at least one captured image or image feature of the image.

14. The apparatus of claim 13, wherein the apparatus is comprised in the mobile device, and the apparatus is further caused to perform:
receiving at least one pre-stored image or image feature of the building from the server; and
positioning the mobile device in the building further on the basis of a comparison between the received at least one pre-stored image or image feature of the building and the captured at least one image or image feature.

15. A method, comprising:
acquiring an indication of at least one magnetic field vector measured by a mobile device indoors, wherein the magnetic field vector represents magnitude and direction of the earth's magnetic field affected by the local structures of a building;
acquiring at least one image or image feature of at least one image, wherein each image is captured by the mobile device in the building where the at least one magnetic field vector is measured, and wherein the image feature comprises a local binary pattern (LBP) histogram of the corresponding image; and
applying the at least one magnetic field vector and the at least one image or image feature in positioning the mobile device in the building.

16. A non-transitory computer program product embodied on a distribution medium readable by a computer and comprising program instructions which, when loaded into an apparatus, execute a method comprising:
acquiring an indication of at least one magnetic field vector measured by a mobile device indoors, wherein the magnetic field vector represents magnitude and direction of the earth's magnetic field affected by the local structures of a building;
acquiring at least one image or image feature of at least one image, wherein each image is captured by the mobile device in the building where the at least one magnetic field vector is measured, and wherein the image feature comprises a local binary pattern (LBP) histogram of the corresponding image; and
applying the at least one magnetic field vector and the at least one image or image feature in positioning the mobile device in the building.

17. An apparatus, comprising:
at least one processor and at least one memory including a computer program code, wherein the at least one memory and the computer program code are configured to, with the at least one processor, cause the apparatus to perform at least operations comprising:
acquiring an indication of at least one magnetic field vector measured by a mobile device indoors, wherein each magnetic field vector represents magnitude and direction of the Earth magnetic field affected by the local structures of a building;

acquiring at least one image or image feature of at least one image, wherein each image is captured by the mobile device in the building where the at least one magnetic field vector is measured, and wherein the image feature comprises a local binary pattern (LBP) histogram of the corresponding image; and applying the at least one magnetic field vector and the at least one image or image feature in positioning the mobile device in the building.

18. A method, comprising:

acquiring an indication of at least one magnetic field vector measured by a mobile device indoors, wherein the magnetic field vector represents magnitude and direction of the earth's magnetic field affected by the local structures of a building;

acquiring at least one image or image feature of at least one image, wherein each image is captured by the mobile device in the building where the at least one magnetic field vector is measured, and wherein the mobile device is equipped with at least two cameras and the mobile device is configured to capture at least two images with the cameras;

applying each of the at least two images in positioning the mobile device in the building; and applying the at least one magnetic field vector and the at least one image or image feature in positioning the mobile device in the building.

19. A non-transitory computer program product embodied on a distribution medium readable by a computer and comprising program instructions which, when loaded into an apparatus, execute a method comprising:

acquiring an indication of at least one magnetic field vector measured by a mobile device indoors, wherein the magnetic field vector represents magnitude and direction of the earth's magnetic field affected by the local structures of a building;

acquiring at least one image or image feature of at least one image, wherein each image is captured by the mobile device in the building where the at least one magnetic field vector is measured, and wherein the mobile device is equipped with at least two cameras and the mobile device is configured to capture at least two images with the cameras;

applying each of the at least two images in positioning the mobile device in the building; and applying the at least one magnetic field vector and the at least one image or image feature in positioning the mobile device in the building.

* * * * *